May 17, 1960
F. V. PORTER
2,937,005
CORE SAMPLER
Filed Aug. 23, 1956
2 Sheets-Sheet 1
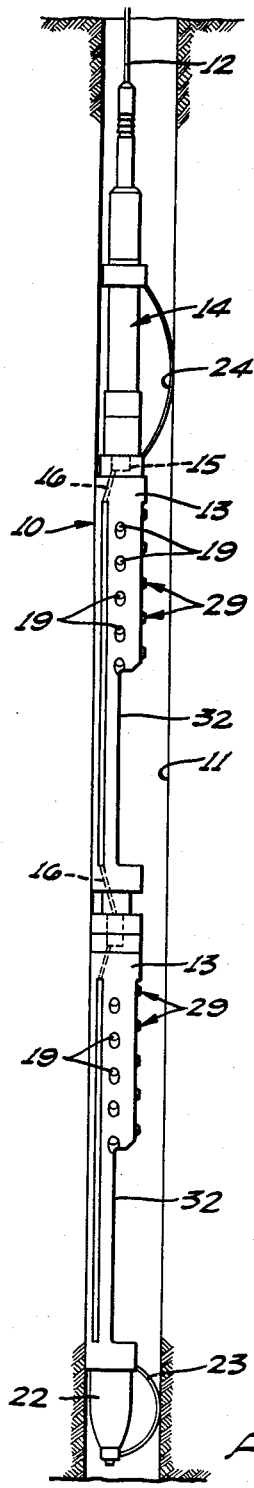
FIG. 1.
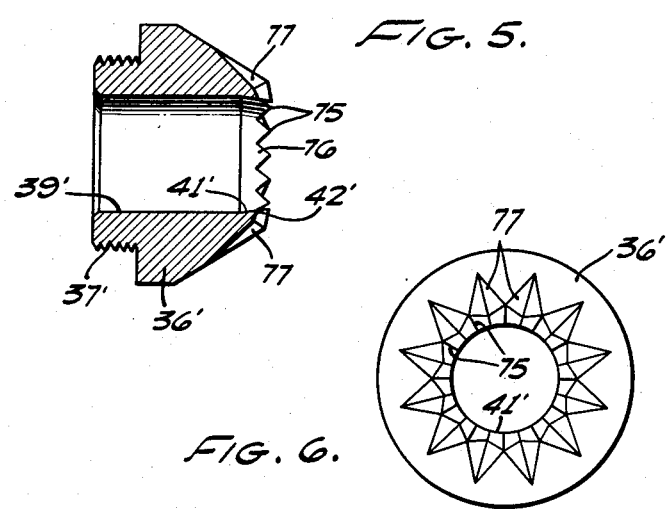
FIG. 5.
FIG. 6.
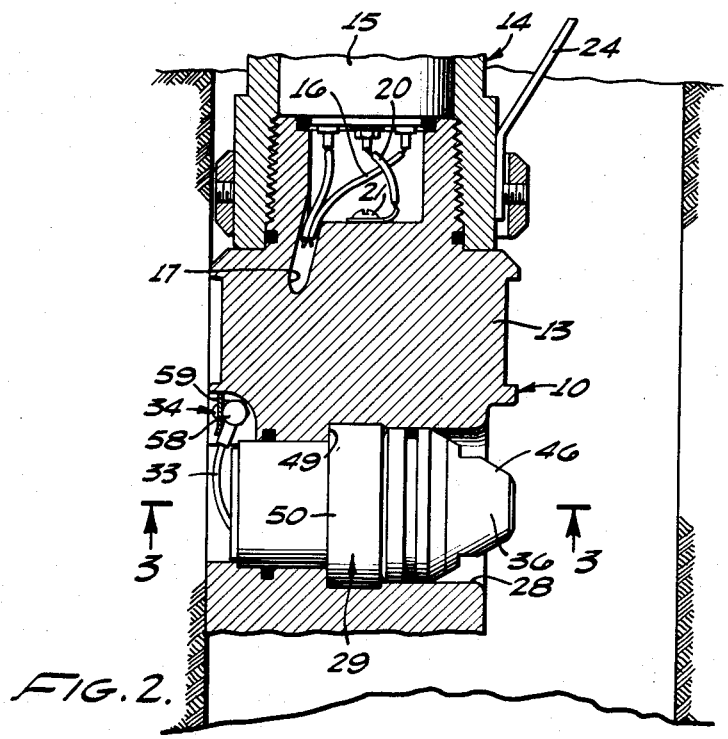
FIG. 2.
INVENTOR.
FORREST V. PORTER
BY
ATTORNEY May 17, 1960     F. V. PORTER     2,937,005
CORE SAMPLER Filed Aug. 23, 1956     2 Sheets-Sheet 2

INVENTOR.
FORREST V. PORTER
BY
ATTORNEY

United States Patent Office 2,937,005
Patented May 17, 1960

2,937,005

CORE SAMPLER

Forrest V. Porter, Monterey Park, Calif., assignor, by mesne assignments, to Dresser Industries, Inc., Dallas, Tex., a corporation of Delaware Application August 23, 1956, Serial No. 605,889

5 Claims. (Cl. 255—1.4)

This invention relates to core sampling devices and more particularly to an improved device of this type designed to cut a sample of an earth formation from the wall of a borehole by means lowered into the borehole and controlled from the top end thereof.

It is now common practice to take a sample of the earth formation by firing a tubular cutter known as a core barrel into the formation from a gun assembly by means of a powerful explosive charge. Usually a series of the core barrels are mounted in separate bores directed radially at longitudinally spaced points along a steel cylinder forming a principal component of the gun assembly. Although such guns are in common use many problems are encountered for which satisfactory solutions have not been found. For example, suitable samples of certain kinds of rock formations have not been always satisfactorily obtained with the afore-described sampler technique due to the fragile or brittle character of such formations and their tendency to disintegrate as they are struck by the high velocity cutter. On the other hand, consistently satisfactory unbroken samples of other less fragile rock formations are obtainable using the same gun, cutter and propelling charge. Close study and comparison of results of many sampling operations conducted under varying conditions lead to the development of the present core barrel design and technique for recovering integral samples of rock formations. Although the device is especially satisfactory for use in securing specimens of extremely hard, brittle, and granular types of formations, it also has been found highly effective in taking samples of many other types of formations under a wide range of subsurface conditions.

The core barrel of the present invention features the use of a flowable backup substance filling its sample-receiving bore, the backup substance being displaceable through a restrictor upon contact with the sample and being co-operable therewith to provide fluent plastic support for the sample as it enters the receiving chamber therefor. Thus it has been found that the harder granular types of formations, particularly when under the high internal pressure customarily existing at subsurface levels, spall and disintegrate as the high velocity cutter enters the formation. The pressurized support provided by the plastic backup substance and restriction obtained by the use of the present invention, lends support to the sample during and after its entrance into the core cutter, with the result that spalling and disintegration are eliminated.

The uniform diameter sample-receiving bores of core barrels heretofore employed have also been found to be a serious contributing cause of sample disintegration. The reason for this appears to be the sudden and uncontrolled release of the subsurface pressures and of the associated internal stresses as the surrounding formation is displaced as an incident to the sample cutting operation. By the present invention the relief of internal stresses naturally present, occurs more gradually, and preferably only to a partial degree in the case of samples having a high coefficient of expansion.

Another feature of the present invention is a core barrel construction having a serrated cutting edge so formed as to facilitate the rapid and finely divided disintegration of the formation immediately surrounding the sample to be recovered.

In view of the foregoing factors and conditions characteristic of core sampling devices and techniques heretofore used, it is a primary object of the present invention to provide an improved core sampling device for use in earth bore holes.

Another object is the provision of a core sampler having a fluent plastic substance providing pressurized support for the sample as it enters the sampler.

Another object is the provision of an improved core barrel designed to relieve stresses within the sample gradually during its severance from an earth formation.

A further object of the invention is the provision of a core sampler having a separable nose piece secured to the forward end of the main body and co-operable therewith to support a restrictor for metering the displacement of a fluent medium in the sample chamber by the entry of the sample thereby maintaining a backup pressure on the sample during the coring thereof.

Still another object is the provision of a core sampler having a hollow body separated by a restrictor plate into a cable housing and a core sample chamber.

These and other more specific objects will appear upon reading the following specification and claims and upon considering in connection therewith the attached drawings to which they relate.

Referring now to the drawings in which a preferred embodiment of the invention is illustrated:

Figure 1 is a sectional view through an earth borehole showing a core sampler gun assembly in side elevation;

Figure 2 is a fragmentary longitudinal sectional view through the gun taken through the uppermost core sample firing station;

Figure 5 is a longitudinal sectional view through an alternate nose piece for the core barrel; and Figure 6 is an end plan view from the forward end of Figure 5.

Figure 3:
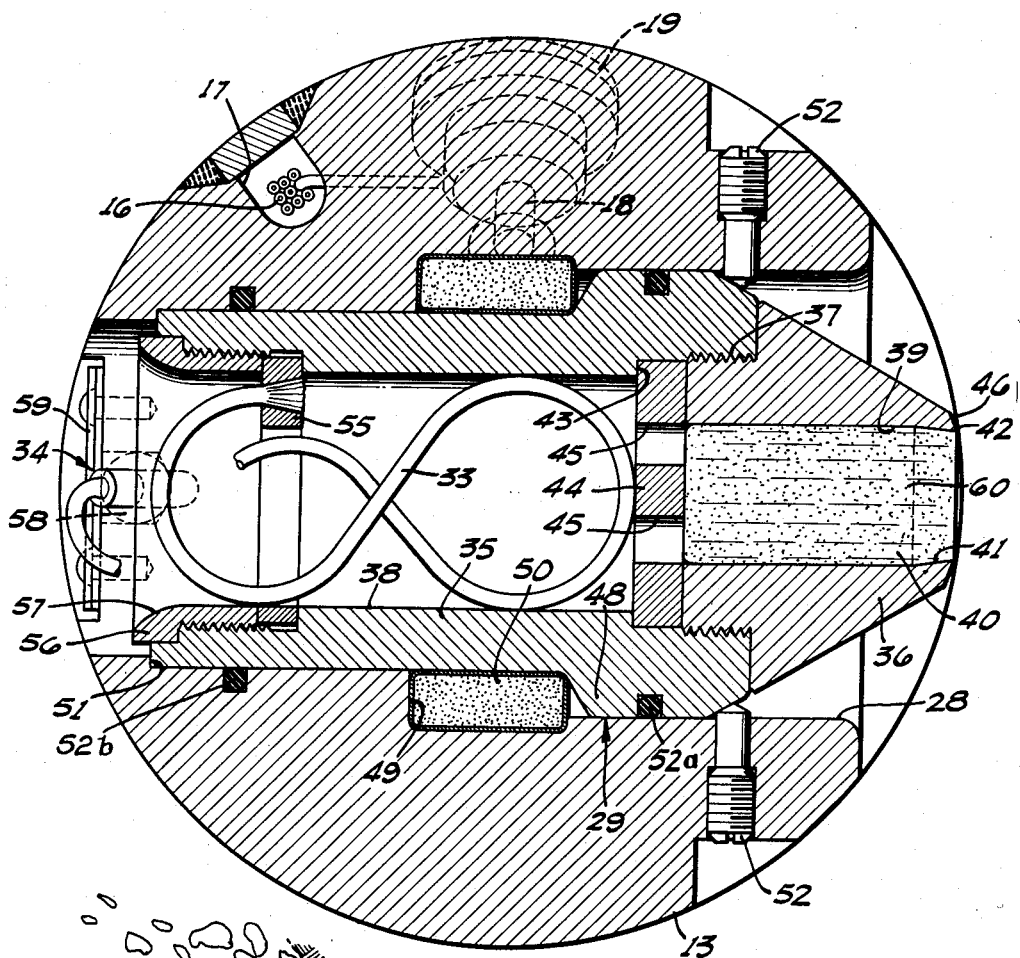
Figure 3 is a transverse sectional view taken along line 3—3 of Figure 2 showing certain details of the construction for the firing of the core barrel.

Referring now to Figures 1 and 2 a suitable gun assembly for obtaining core samples, designated generally at 10 is shown, which is adapted to be suspended in an earth borehole 11 on a conductor cable 12. The gun assembly comprises one or more solid high strength metal cylindrical bodies 13 two of which are shown by way of illustration, connected end to end by suitable coupling means, the details of which are not shown. The uppermost cylindrical body is connected to the conductor cable 12 through a cablehead assembly 14, it being understood that the latter houses an electrical firing mechanism 15 connected to an electrical conductor in the cable 12 and having separate leads 16 extending therefrom through a longitudinal passage 17 leading to individual igniters 18 for igniting the separate explosive charges for the respective core sampler devices. Igniters 18 can be replaced after each use of the gun by unscrewing the removable plugs 19 normally closing each bore leading into each of the igniter cavities as is well known in the art but which is not shown in detail because they form no part of the present invention. The return electrical circuit for the firing mechanism includes a lead 20 grounded to gun body 13 as by screw 21.

The lower end of the lower gun body is provided with a bull plug 22 which is bridged along one side by a stiff guard spring 23. It will be understood that the spring is positioned on the same face of the gun body as the forward ends of the core barrels. In consequence, spring 23 together with a similar bowed spring 24 extending along the side of the gun body at its upper end cooperate to hold the forward ends of the core barrels spaced away from the one side of the borehold thereby permitting the barrels to reach as high a velocity as possible before contacting the formation and for providing clearance for the core barrels in the retrieving operation as hereinafter more fully explained.

Gun bodies 13 are provided with a plurality of transversely directed stepped bores 28 each adapted to contain a core sampling projectile, sometimes referred to as a core barrel, designated generally 29. Usually bores 28 are grouped in a series of five, spaced apart longitudinally of the gun body. As shown in Figure 1, there are two groups of sampling stations each having a recess 32 positioned immediately below an overlying group of the core sampling devices. Cutouts 32 accommodate the core barrels 29 after firing and while suspended from captive cables 33 in a manner to be described in greater detail hereinafter. One end of each of these cables is secured to the gun body as indicated at 34, the other end of each of the cables being firmly secured to the rear end of a core barrel as shown at 55.

Referring now to Figure 3 it will be seen that core barrels 29 each comprise a main body 35 and a nose piece 36 separably secured together as by screw threads 37. Both the main body and the nose piece are provided with longitudinal, coaxial bores, 38 and 39 respectively, bore 38 being sufficiently large to enclose and frictionally retain the flexible cable 33 used to secure the core barrel to the gun body. The somewhat smaller diameter bore 39 in the nose piece forms a core sample receiving chamber 40 of uniform inside diameter except at its forward end where its walls forwardly converge at a small angle, such as, for example, 5 degrees, to merge with a circular sharp-edged cutting rim 42 to form a forward entrance of slightly reduced inside diameter. The frusto-conical inside surface 41 thus formed, provides an inside surface of gradually increasing diameter from the cutting edge 42 to its merger with the main body of core 39, its function being to permit the gradual and controlled expansion of the core sample as it enters the bore for a purpose to be explained hereinafter.

The forward end of bore 38 is provided with a shoulder 43 forming a seat for a high-strength thick-walled restrictor disc or partition 44 having one or more openings or apertures 45 therethrough providing communication between bores 38 and 39. Restrictor disc 44 is held assembled against shoulder 43 by the rear end of nose piece 36 in a manner made clear by Figure 3. The exterior surface of the nose piece converges towards the forward end thereof and merges with the narrow frusto-conical surface 46 forming the blunt cutting edge of the nose piece.

The forward end of main body 35 of the core barrel has a broad, outwardly projecting annular flange 48 cooperating with an annular shoulder 49 in bore 28 to form therebetween a chamber for an annular shaped charge of a combustible propellent material 50. The rearmost end of the core barrel seats against a forwardly-facing annular shoulder 51 at the rear end of bore 28 and is initially held seated thereagainst by a pair of set screws 52 having conical inner ends projecting radially into bore 28 and bearing against the conical forward end of the core barrel. It will be understood that the portions of the set screws projecting into bore 28 are sheared away when the propellent charge 50 is detonated to project the core barrel 29 from the gun bore 28. The rear end portions of bore 28 and the flanged end 48 of the core barrel are provided with annular grooves seating O-rings 52a and 52b, or the like, sealing gaskets which prevent well fluids from entering and contacting the propellent charge 50 and also confine the propellent gases during the initial stage of the firing operation.

While the specific details of the flexible cable 33 and of the means for securing it to the gun body and to the core barrel are not a part of the present invention, it will be understood that it is important that the portions of the gun assembly coming in contact with the cable during the firing of the projectile or core barrel be suitably rounded to prevent damage or severance of the cable. These objectives are achieved according to the present construction by anchoring the inner end of cable 33 to a ring 55 held seated against the shoulder of bore 38 by a threaded bushing 56 having a well-rounded surface 57 at its outer end. The other end of cable 33 is swaged to a ball terminal 58 held seated in a socket of the gun body by a keeper plate 59. Cable 33 may be from 15 to 30 inches in length, depending on the size of the borehole, and has sufficient resiliency to permit of its ready coiling and frictional retention within bore 38 of the core barrel body during handling of the assembly and its lowering into a borehole.

In operation, sampling gun assembly 10 is prepared at the surface for lowering into the bore hole by placing a propellent charge 50 within the chamber provided therefor in bore 28 after which the core barrels 29 are inserted through the forward large diameter end of the respective bores. Making certain that the rear end of the core barrel seats against shoulder 51, the operator turns set screws 52 inwardly until their ends seat against the conical nose of the forward end of the barrels as is indicated in Figure 3. The flexible cable 33 is then coiled and the coils flattened sufficiently for insertion through the rear end of bore 38 with its opposite sides frictionally engaging the sides of bore 38 in the manner indicated in Figure 3. It will of course be understood that an igniter 18 is installed beneath each of the removable plugs 19 with the inner end of the igniter in firing relation to the explosive charge 50, the end of the igniter lead wire 16 being connected in known manner to fire the igniter when energized by the firing mechanism 15. The sample receiving chamber 40 of each nose piece 36 is also preferably filled with a suitable fluent plastic-like substance 60, as for example with soft putty or the like material, preferably insoluble in the well fluids. Desirably, the fluency of substance 60 should remain substantially constant over temperature ranges normally encountered in well boreholes. However, it is to be understood that acceptable and satisfactory results are obtained without pre-filling chambers 40 with plastic substance 60. This is particularly true where the well is filled with a high viscosity liquid or with drilling mud as is customarily the case. This is for the reason that heavier liquids or drilling mud provide substantially the same results as does the fluent plastic material 60, particularly where the areas of apertures 45 in restrictor disc 44 are somewhat smaller than those employed with plastic material 60.

After the core barrels for each of the firing stations have been prepared in the manner described, the gun assembly is lowered into the borehole by means of the beforementioned conductor cable 12. So long as the gun is within the well, spring guard members 23 and 24 are effective to hold the forward end of the core barrel spaced from the sidewall of the borehole thereby enabling the core barrels to attain a maximum velocity before their cutting rims come into contact with the formation being sampled. Once the gun has reached its desired location the electrical circuit for firing mechanism 15 is energized and the igniters associated with the propellent charge of each core barrel are fired sequentially through their separate conductor leads 16 in accordance with conventional practice. The firing of the propellent charge projects the core barrels from the gun body at very high velocity causing nose pieces 36 to enter the formation in the manner depicted in Figure 4.

Figure 4:
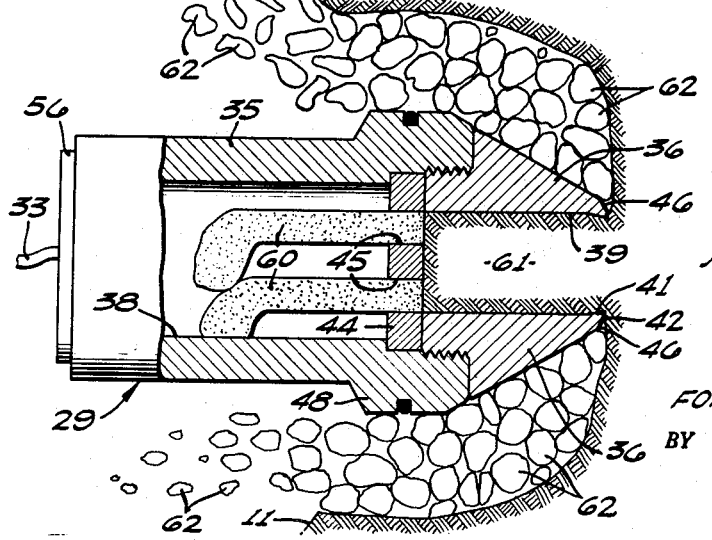
Figure 4 is a longitudinal sectional view through the gun showing one of the core barrels an instant after being fired and as it reaches maximum penetration into the earth formation.

Immediately upon contact of cutting edge 42 with the formation, the fluent substance, such as 60, trapped within bore 39 is placed under high pressure causing it to be extruded rearwardly through perforations 45 into bore 38 of main body 35 in the manner depicted in Figure 4. As will be apparent, the high pressure acting on substance 60 as well as against the exposed end of sample 61 is a function of the fluency of plastic material 60 and of the area of apertures 45 relative to the area of bore 39. The pressure so applied to the end of the sample is highly effective in preventing both spalling and disintegration of the sample due to the severing shock imparted by the nose piece and the sudden release of internal pressures acting on the sample prior to its severance.

Cooperating with restrictor device 44 and controlling the release of this internal pressure is the restricted forward end of bore 39 by reason of the frusto-conical wall 41, the latter providing for the gradual radial expansion of sample 61 as it enters bore 39 thereby gradually releasing the formation pressures automatically and as an incident to the coring operation. In consequence the formation sample does not disintegrate but remains integral even in instances in which the formation is of an unusually hard and brittle granular consistency.

It is also to be observed from Figure 4 that the entry of the core barrel into the formation causes a surrounding ring of the formation of a diameter several times greater than the diameter of the core barrel to disintegrate into small particles 62 and to be expelled in a generally conical pattern surrounding the core barrel. In consequence, a large cavity is provided in the area about the core barrel thereby permitting the barrel to be pivoted away from the axis thereof to sever sample 61 from the main body of the formation.

After the several core barrels have been sequentially fired into the sidewall, the surface crew may retrieve the gun assembly by withdrawing cable 12. As the assembly starts to rise, tension applied to flexible cables 33 causes any core barrel not previously severed from the formation to pivot and sever the core sample from the formation. The core barrels with their captive samples hang suspended by the cables within the recesses or cutouts 32 immediately below each sampling station. These cutouts together with spring guards 23 and 24 prevent damage or separation of the core barrels from the gun body during the withdrawal operation.

Once the gun has been recovered, nose pieces 36 are unscrewed from bodies 35 so that pressure may be applied to the forward end of the samples to expel them from bores 39. Usually the initial expansion of the samples as permitted by wall 41 is such as still to maintain considerable frictional contact between the sample and the bore wall requiring the application of considerable pressure to expel the sample. In other cases the sample is relatively free and is retained captive within bore 39 by reason of the resistor disc 44. Once removed the sample is available for careful inspection and analysis in the usual manner to disclose invaluable information about the oil bearing characteristics of the formation from which it was obtained.

Figures 5 and 6 illustrate a second embodiment of the nose piece differing from that described above in that cutting rim 42' is suitably serrated, as for example in the manner illustrated, to provide a series of sharp cutting edges 75 arranged in spaced relation circumferentially of the nose piece and extending radially of the body of nose piece 36'. It will be observed that the cutting teeth include triangular shaped flutes 77 extending along the face of the nose piece and providing channels through which chips 62 of the formation escape as the core barrel enters the formation. As will be observed, the sample receiving bore 39' merges at its forward end in an inwardly converging frusto-conical section 41' having the same purpose and function as the similarly shaped portion 41 of the first described embodiment. It will be understood that nose piece 36' is assembled to the main body 35 of the core barrel and holds a restrictor disc 44 in position between the coupled ends of the two principal parts of the core barrel.

It is found that the serrated design of nose piece illustrated in Figure 5 results in the fragmentation of the surrounding formation more readily and into much smaller fragments with the result that in extremely hard formations improved recovery of formation samples is accomplished, as compared to those frequently obtained with the first-described construction. The frusto-conical surface of 41' will also be understood to function in the same manner as similar surface 41 of the first embodiment.

While the particular core sampling device herein shown and described in detail is fully capable of obtaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. A projectile for taking samples of earth formations surrounding a borehole comprising: a tubular body portion having a first open-ended axial passage extending therethrough; a cutting head portion detachably connected to the forward end of said tubular body, said head having a second open-ended axial passage therethrough coaxial with said first axial passage, and a forwardly-tapering exterior surface terminating in a cutting edge adjacent the line of intersection thereof with the interior surface of said second axial passage; a detachable transverse partition located adjacent the forward end of said tubular body portion, intermediate the said first and said second axial passages, and thereby separating said first axial passage from said second axial passage; at least one aperture extending through said partition interconnecting said axial passages and having a cross-sectional area relatively small as compared to the cross-sectional area of said second axial passage; a body of plastic material initially contained within said second axial passage; and an elongated, flexible retrieving means extending into and attached at one end thereof to the interior of said tubular body portion and initially, largely contained within said first axial passage.

2. A projectile for taking samples of hard earth formations surrounding a liquid-filled borehole comprising: a tubular body having an open-ended passage extending therethrough; an open-ended, hollow, cutting head positioned on the forward end of said tubular body portion having an axial passage therethrough coaxial with said first-mentioned axial passage, said passages having free access to borehole liquid through the ends thereof to be filled with borehole liquid when said projectile is in readiness in position for use in such borehole; a partition disposed adjacent the rear end of said cutting head extending across the rear end of said second-named passage to close the rear end of such passage to form a core-receiving chamber within said cutting head open at its forward end and a cable-receiving cavity within said body open at its rearward end; and means on said body rearwardly of said partition for connecting the end of a cable to the projectile; said partition having a fluid flow restriction aperture therein placing said core-receiving chamber in restricted communication with said cable-receiving cavity in said tubular body and serving to establish resistance to flow of borehole liquid displaced into said first-named passage by an earth sample entering said chamber upon firing of said projectile, restricted flow of borehole liquid through said aperture from said chamber providing a back-pressure on said sample as said sample enters said chamber thereby to minimize spalling and disintegration of the sample of hard earth formation resulting from sudden release of internal pressures acting on the sample prior to its severance.

3. A projectile for taking samples of hard earth formations surrounding a liquid-filled borehole comprising: a tubular body having an open-ended passage extending therethrough; an open-ended, hollow, cutting head portion on the forward end of said tubular body portion having an axial passage therethrough coaxial with said first-mentioned axial passage and of substantially reduced inside transverse dimension relative to that of said first-mentioned axial passage, said passages having free access to borehole liquid through the ends thereof to be filled with borehole liquid when said projectile is in readiness in position for use in such borehole; a partition disposed adjacent the rear end of said cutting head extending across the rear end of said second-named passage to close the rear end of such passage to form a core-receiving chamber within said cutting head open at its forward end, and a cable-receiving cavity within said body open at its rearward end; and means on said body rearwardly of said partition for connecting the end of a cable to the projectile; said partition having a fluid flow restriction aperture therein placing said core-receiving chamber in restricted communication with said cable-receiving cavity in said tubular body and serving to establish resistance to flow of borehole liquid displaced into said first-named passage by an earth sample entering said chamber upon firing of said projectile, restricted flow of borehole liquid through said aperture from said chamber providing a back-pressure on said sample as said sample enters said chamber thereby to minimize spalling and disintegration of the sample of hard earth formation resulting from the sudden release of internal pressures acting on the sample prior to its severance.

4. A projectile for taking samples of hard earth formations surrounding a liquid-filled borehole comprising: a tubular body having an open-ended passage extending therethrough; an open-ended, hollow, cutting head positioned on the forward end of said tubular body portion having an axial passage therethrough coaxial with said first-mentioned axial passage, said passages having free access to borehole liquid through the ends thereof to be filled with borehole liquid when said projectile is in readiness in position for use in such borehole; a partition disposed adjacent to the rear end of said cutting head extending across the rear end of said second-named passage to close the rear end of such passage to form a core-receiving chamber within said cutting head open at its forward end, and a cable-receiving cavity within said body open at its rearward end; and means on said body rearwardly of said partition for connecting the end of a cable to the projectile; said partition having a flow restriction aperture therein said aperture being of small cross-sectional area compared to the transverse cross-sectional area of said second-named passage and placing said core-receiving chamber in restricted communication with said cable-receiving cavity in said tubular body and serving to establish resistance to flow of borehole fluid displaced into said first-named passage by an earth sample entering said chamber upon firing of said projectile, restricted flow of borehole liquid through said aperture from said chamber providing a back-pressure on said sample as said sample enters said chamber thereby to minimize spalling and disintegration of the sample of hard earth formation resulting from sudden release of internal pressures acting on the sample prior to its severance.

5. A projectile for taking samples of earth formations surrounding a borehole comprising: a tubular body portion having an open-ended axial portion extending therethrough; a cutting head portion on the forward end of said tubular body portion, having an open-ended axial passage therethrough coaxial with said first-mentioned axial passage and of substantially reduced transverse dimension relative to that of said first-mentioned axial passage; a body of plastic material initially contained in said second-mentioned axial passage; an interior partition intermediate said first-mentioned and said second-mentioned axial passages; an aperture extending through said partition forming a restricted fluid-flow channel between said passages; and an elongated flexible retrieving member extending into the rearward end, and attached at one end thereof to the interior of, said tubular body portion.

References Cited in the file of this patent

UNITED STATES PATENTS

| | | |
|---|---|---|
| 2,055,506 | Schlumberger | Sept. 29, 1936 |
| 2,288,210 | Schlumberger | June 30, 1942 |
| 2,426,335 | Banning | Aug. 26, 1947 |
| 2,678,804 | Lebourg | May 18, 1954 |
| 2,809,807 | Schneersohn et al. | Oct. 15, 1957 |

FOREIGN PATENTS

| | | |
|---|---|---|
| 703,975 | Great Britain | Feb. 10, 1954 |